United States Patent [19]

Majewska et al.

[11] 4,049,775

[45] Sept. 20, 1977

[54] METHOD FOR PURIFYING WASTE AIR FROM SULPHURIC GASES, PARTICULARLY IN THE PRODUCTION OF VISCOSE FIBRES

[75] Inventors: Janina Majewska; Wiktor Grams; Zbigniew Rybicki; Józef Banasiak, all of Łódź, Poland

[73] Assignee: Instytut Wlokien Chemicznych, Łódź, Poland

[21] Appl. No.: 621,626

[22] Filed: Oct. 10, 1975

[30] Foreign Application Priority Data

Oct. 15, 1974 Poland .................................. 174848

[51] Int. Cl.$^2$ ............................................. B01D 53/34
[52] U.S. Cl. ................................ 423/224; 423/226; 423/228; 423/242; 423/243; 423/551
[58] Field of Search ............... 423/210, 220, 224, 226, 423/242, 243, 551, 228

[56] References Cited

U.S. PATENT DOCUMENTS

| | | | |
|---|---|---|---|
| 1,765,869 | 6/1930 | Jaeger et al. | 423/242 |
| 2,781,863 | 2/1957 | Bloch et al. | 423/226 |
| 3,794,711 | 2/1974 | Bhatia et al. | 423/224 |
| 3,873,672 | 3/1975 | Nishiba et al. | 423/242 |
| 3,969,479 | 7/1976 | Lonnes et al. | 423/224 |

FOREIGN PATENT DOCUMENTS

| | | | |
|---|---|---|---|
| 672,084 | 10/1963 | Canada | 423/226 |

Primary Examiner—Earl C. Thomas

[57] ABSTRACT

This invention relates to a method for purifying waste air from sulphuric gases, in particular from hydrogen sulphide, carbon disulphide and sulphur dioxide by adsorption and oxidation in a bath containing inorganic oxidizing compounds soluble in water, e.g. hypochlorites of alkali metals, preferably sodium hypochlorite in an amount equivalent to at least 0.1 g, preferably 3-5 g of available chlorine per 1 liter of bath and, if need be additions in the form of chemisorbents such as polyethylene glycol or aliphatic amines in an amount of at least 0.005 g/l of bath, and/or oxidation catalysts such as vanadium and/or palladium salts in an amount of at least 0.01 g/l of bath, and/or organic oxidizing compounds soluble in water such as hydroquinone in an amount of at least 0.1 g/l of bath, with a pH-value of 9-12, in a closed cycle of bath.

9 Claims, No Drawings

METHOD FOR PURIFYING WASTE AIR FROM SULPHURIC GASES, PARTICULARLY IN THE PRODUCTION OF VISCOSE FIBRES

The invention relates to a method for purifying industrially polluted air fron sulphuric gases, in particular from hydrogen sulphide, carbon disulphide and sulphur dioxide, during one operation, by absorbing and oxidizing said gases in a bath.

In industrial processes, particularly in the production of viscose fibers, the sulphuric gases, diluted with air and taken off to the atmosphere, represent a serious threat to human health and environment. In order to protect from noxious action of the said gases, they are removed from the waste air with possibility of regeneration for repeated utilization.

Hydrogen sulphide is removed from the outflowing air, in the production of e.g. viscose fibers, by absorption in soda lye or by using a Laut mass in the dry form or in an aqueous alkaline suspension, or in alkaline suspension of iron hydroxide with or without addition of hydrated nickel and cobalt oxides as reaction catalysts.

A method is also known of removing hydrogen sulphide from the waste air by absorption and oxidation of the hydrogen sulphide in an aqueous alkaline bath containing organic oxidizing compounds e.g. hydroquinone, where the air is introduced into a scrubber and sprinkled therein with the above - mentioned bath counter currently, said bath is applied in a closed cycle from a pond in which it is aerated in a continuous manner.

As a result of chemisorption of the hydrogen sulphide, acid sodium sulphide and sodium sulphide are obtained, and a redox system hydroquinone $\rightleftarrows$ quinone occurs in the cycle bath. This system is broken, on the one hand, by oxygen from the air oxidizing hydroquinone to quinone, and on the other hand by acid sodium sulphide and sodium sulphide which, being oxidized to free sulphur, reduce quinone back to a hydroquinone.

In the described kinetics system of oxidizing the hydrogen sulphide to free sulphur, considerable oxygen deficiency takes place which results in diminishing the efficiency of the cycle bath and accumulating therein acid sodium sulphide and sodium sulphide. Besides, the presence of carbon disulphide and sulphur dioxide in addition to the hydrogen sulphide in waste gases decreases the oxidizing properties of quinone, because thiocarbon compounds and sulphone derivatives of hydroquinone are formed, which are oxidized with oxygen from the air far slower than hydroquinone. For that reason still greater oxygen deficiency, occurs, thereby the rate of oxidizing the acid sodium sulphide and sodium sulphide to free sulphur decreases.

In order to ensure a correct course of redox reaction, it is imperative to use very large installations for a cycle bath in order to have enough air to oxidize hydroquinone continuously as well as a large amount of expensive hydroquinone in order to maintain the efficiency of this process. Besides, the creation of considerable amounts of thiosulphates, sulphites and sulphides, which are than taken off to waste effluents, constitutes a serious threat to human environment.

The above - described method, apart from the inconveniences presented, makes it possible to purify polluted air from hydrogen sulphide with an efficiency in the range of 50 - 70 %.

In order to purify the air from hydrogen sulphide and carbon disulphide, two-stage processes are usually employed in industry, wherein at first the hydrogen sulphide is removed by washing out with an alkaline bath, from which said hydrogen sulphide is expelled during the regeneration process, and the carbon disulphide is adsorbed e.g. on an active carbon and regenerated with steam. These methods however are unprofitable in the case of an intensive diluting of the said cases with air.

There is also a known method of purification of the waste air from sulphuric gases which consists in simultaneously converting hydrogen sulphide, carbon disulphide and carbon oxysulphide into sulphur dioxide by burning dry in the presence of catalysts, then absorbing the obtained sulphur dioxide in a sodium phosphate solution. This method though make it possible to remove sulphuric gases during one operation, is not used on an industrial scale because of high operating costs.

In accordance with the invention purification of the waste air form sulphuric gases, in particular from hydrogen sulphide, carbon disulphide and sulphur dioxide is performed by absorbing and oxidizing said gases in an aqueous alkaline bath, and the applied bath contains inorganic oxidizing compounds soluble in water, e.g. hypochlorites of alkali metals, preferably sodium hypochlorite in an amount equivalent to at least 0.1 g, preferably 3—5 g, of active chlorine per 1 liter of bath, where absorption and oxidation of sulphuric gases are carried out with pH- value of 9 - 12, in a closed cycle of bath.

The reaction of oxidizing hydrogen sulphide and sulphur dioxide is performed quickly and with great efficiency, the process of oxidizing the carbon disulphide however proceeds much slower and with reduced efficiency.

It was discovered that an addition of a small amount of chemisorbents and, if need be catalysts for oxidation of a cycle bath had a positive effect on the efficiency of purification of sulphuric gases diluted with air, particularly when they contained carbon disulphide.

As chemisorbents, polyglycol - type compounds of a molecular weight less than 300, preferably a polyethylene glycol or aliphatic amines, preferably diethanolamine or ethylenediamine or their salts, in an amount of at least 0.005 g/l of bath, are used.

As oxidation catalysts, vanadium and/or palladium salts are used, prefereably their sulphides in an amount of at least 0.01 g/l of bath.

It was stated that the method for purifying the outflowing air from hydrogen sulphide, carbon disulphide and sulphur dioxide according to the invention, could be successfully applied in the plants equipped with installation for purifying the waste air from hydrogen sulphide by absorption and oxidation in an aqueous alkaline hydroquinone bath.

In this case, a cycle bath is applied containing, apart from inorganic oxidizing compounds e.g. sodium hypochlorite and, if need be, chemisorbents and oxidation catalysts, additionally hydroquinone in an amount of at least 0.1 g/1 of bath, and it is advisable to apply a bath in which the quantitative ratio of sodium hypochlorite to hydroquinone is 2 : 1.

With a cycle bath containing hydoquinone in addition to sodium hypochlorite, the oxidation of sulphuric gases takes place in a system of two oxidizing agents-sodium hypochlorite and hydroquinone. The sodium hypochlorite brings about the oxidation of acid sodium sulphides and sodium sulphides to sulphates, and at the same time it regenerates hydroquinone by oxidizing a sulphone derivative of hydroquinone to sulphates and a quinone.

In such a system, quinone regeneration can be entirely performed by means of sodium hypochlorite without additional oxidizing of the cycle bath with oxygen of the air, because the sodium hypochlorite on the one hand does away with oxygen deficiency arisen in the by hydroquinone bath system and on the other hand oxidizes a surplus of acid sodium sulphides and sodium sulphides to sulphates. The application of a cycle bath containing additionally hydroquinone causes a considerable decrease of the expenditure of the sodium hypochlorite because the hydroquinone covers partially the oxygen demand of the bath by transferring the oxygen from the air by means of the redox reaction hydroquinone $\rightleftarrows$ quinone.

The method acording to the invention provides for purification of the waste air simultaneously from hydrogen sulphide, carbon disulphide and sulphur dioxide during one operation, wherein as a fnal result of oxidizing said gases, sulphates are mainly obtained which are not dangerous for the human environment. Besides, the purification of the air by the method according to the invention is economical and proceeds with great efficiency, namely: for carbon disulphide more than 80 % and for hydrogen sulphide and sulphur dioxide more than 95 %.

EXAMPLE I.

The air from ventilation drafts of a viscose plant containing 30 mg/m$^3$ of hydrogen sulphide, 368 mg/m$^3$ of carbon disulphide and 8 mg/m$^3$ of sulphur dioxide was supplied at a velocity of 1 m/sec by ventilation channels to an absorption column filled with Rasching rings, where it was sprinkled counter currently with an aqueous alkaline bath of the following composition and amount of particular components calculated per 1 liter of bath:
 3 g of sodium hydroxide
 9 g of sodium carbonate
 7 g of sodium hypochlorite, which corresponds to 3.5 g of available chlorine
 0.5 g of diethylemanine hydrochloride.

The absorption and oxidation of sulphuric gases were carried out in a closed cycle of bath with a pH-value of 9.5-10.

After passing the absorption column the air contained less than 1 mg/m$^3$ of hydrogen sulphide, a result below the level of detectability of hydrogen sulphide by a method involving forming methylene blue, about 65 mg/m$^3$ of carbon disulphide determined by a method involving forming cupric cabamate and did not contain sulphur dioxide when examined by a method using p-rosaniline hydrochloride.

The process proceeded thus with the following efficiency: more than 95 % in relation to hydrogen sulphide, more than 80 % in relation to carbon disulphide and 100 % in relation to sulphur dioxide.

EXAMPLE II

Th air from ventilation drafts containing 32 mg/m$^3$ of hydrogen sulphide, 180 mg/m$^3$ of carbon disulphide and about 9 mg/m$^3$ of sulphur dioxide was supplied at a velocity of about 3 m/sec by ventilation channels to an absorption column filled with Raschig rings, where it was sprinkled countercurrently with an aqueous alkaline bath comprising a system of two oxidizing agents of the following composition and amount of particular components calculated per 1 liter of bath:
 4 g of sodium hydroxide
 8 g of sodium carbonate
 4 g of sodium hypochlorite, which corresponds to 2 g of available chlorine
 2 g of hydroquinone
 1 g of polyethylene glycol
 1 g of vanadium sulphide The absorption and oxidation of sulphuric gases were carried out in a closed cycle of bath with a pH-value of 9.5-10.

After passing the absorption column the air contained less than 1 mg/m$^3$ of hydrogen sulphide, 20 mg/m$^3$ of carbon disulphide and did not contain sulphur dioxide, and analytical methods for determining said gases were applied as in Example I.

The efficiency of the purification of the air was more than 95 % in relation to hydrogen sulphide, about 89 % in relation to carbon disulphide, and 100 % in relation to sulphur dioxide.

EXAMPLE III

The air ventilation drafts containing 31.2 mg/m$^3$ of hydrogen sulphide, 131.2 mg/m$^3$ of carbon disulphide and about 9 mg/m$^3$ of sulphur dioxide was supplied to an absorption column at a velocity of about 4 m/sec and subjected to absorption and oxidation with a bath of the following composition and amount of components calculated per 1 liter of bath:
 3.91 g of sodium carbonate
 5.46 g of acid sodium carbonate
 0.20 g of sodium hypochlorite, which corresponds to 0.1 g of available chlorine
 0.66 g of hydroquinone
 0.005 g of polyethylene glycol
 0.01 g of vanadium sulphide The absorption and oxidation of sulphuric gases were carried out in a closed bath with a pH-value of 9.4.

After passing the absorption column the air contained 4.2 mg/m$^3$ of hydrogen sulphide, 26.0 mg/m$^3$ of carbon disulphide and did not contain sulphur dioxide, and analytical methods for determining said gases were applied as in Example I.

The efficiency of the purification of the air was 86.5 % in relation to hydrogen sulphide, 80.2 % in relation to carbon disulphide, and 100 % in relation to sulphur dioxide.

EXAMPLE IV

The air from ventilation drafts containing 39.2 mg/m$^3$ of hydrogen sulphide and 180 mg/m$^3$ of carbon disulphide was supplied to an absorption column at a velocity of 4 m/sec and subjected to absorption and oxidation with a bath of the following composition and amount of components calculated per 1 liter of bath:
 2.50 g of sodium hydroxide
 2.35 g of sodium carbonate 1.00 g of sodium hypochlorite, which corresponds to .05 g of available chlorine
 0.33 g of hydroquinone
 0.01 g of polyethylene glycol
 0.01 g of palladium sulphide The absorption and oxidation of sulphuric gases were carried out in a closed cycle of bath with a pH-value of 12.

After passing the absorption column the air contained 3 mg/m$^3$ of hydrogen sulphide and 18 mg/m$^3$ of carbon disulphide, when using analytical methods as in Example I.

The efficiency of the process in relation to hydrogen sulphide was of 92.4 % and to carbon disulphide of 90.0 %.

EXAMPLE V

The air from ventilation drafts containing 30.4 mg/m$^3$ of hydrogen sulphide and 180 mg/m$^3$ of carbon disulphide was supplied to an absorption column at a velocity of about 4 m/sec and subjeced to absorption and oxidation with a bath of the following composition and amount of components calculated per 1 liter of bath:

3.14 g of sodium carbonate
0.34 g of acid sodium carbonate
1.25 g of sodium hydroxide
3.00 g of sodium hypochlorite, what corresponds to
    1.5 g of available chlorine
0.10 g of hydroquinone
0.02 g of polyethylene glycol.

The absorption and oxidation of sulphuric gases were carrid out in the bath with a pH-value of 10.5.

After passing th absorption column the air contained 4.4 mg/m$^3$ of hydrogen sulphide and 24.0 mg/m$^3$ of carbon disulphide, when using analytical methods as in Example I.

The efficiency of the process in relation to hydrogen sulphide was of 85.5 %. and to carbon disulphide 86.7 %.

What we claim is:

1. A method for purifying waste air simultaneously from hydrogen sulphide, carbon disulphide and sulphur dioxide comprising contacting said waste air in a closed cycle with an aqueous alkaline solution of an oxidizing agent consisting of (1) an alkali metal hypochlorite in an amount equivalent to at least 0.1 g. of available chlorine per liter (2) hydroquinone in an amount of at least 0.1 g/1 and (3) at least 0.005 g/1 of a chemisorbent selected from the group consisting of polyglycols having a molecular weight less than 300 and aliphatic amines.

2. The method of claim 1 wherein said hypochlorite is present in an amount equivalent to 3-5 g. of available chlorine per liter.

3. The method of claim 2 wherein said hypochlorite is sodium hypochlorite.

4. The method of claim 3 wherein the ratio of sodium hypochlorite to hydroquinone is 2:1.

5. The method of claim 4 wherein the waste air is the gaseous waste from the production of viscose fibers.

6. The method of claim 1 wherein said polyglycol is polyethylene glycol.

7. The method of claim 1 wherein said aliphatic amine is selected from the group consisting of diethanolamine and ethylenediamine.

8. The method of claim 5 wherein said solution also contains a salt of a metal selected from the group consisting of vanadium and palladium in an amount of at least 0.01 g/1 as a catalyst.

9. The method of claim 8 wherein said salt is a sulphide.

* * * * *